(12) United States Patent
Shimono et al.

(10) Patent No.: US 10,947,023 B2
(45) Date of Patent: Mar. 16, 2021

(54) INSTANT NOODLES CONTAINER LID

(71) Applicants: TOPPAN PRINTING CO., LTD., Tokyo (JP); NISSIN FOODS HOLDINGS CO., LTD., Osaka (JP)

(72) Inventors: Takahiro Shimono, Tokyo (JP); Masashi Goto, Tokyo (JP); Tomohiro Ueno, Osaka (JP)

(73) Assignees: TOPPAN PRINTING CO., LTD., Tokyo (JP); NISSIN FOODS HOLDINGS CO., LTD., Osaka (JP)

( * ) Notice: Subject to any disclaimer, the term of this patent is extended or adjusted under 35 U.S.C. 154(b) by 261 days.

(21) Appl. No.: 16/072,854

(22) PCT Filed: Feb. 8, 2017

(86) PCT No.: PCT/JP2017/004566
§ 371 (c)(1),
(2) Date: Jul. 25, 2018

(87) PCT Pub. No.: WO2017/138561
PCT Pub. Date: Aug. 17, 2017

(65) Prior Publication Data
US 2018/0370706 A1 Dec. 27, 2018

(30) Foreign Application Priority Data
Feb. 9, 2016 (JP) .............................. JP2016-022772

(51) Int. Cl.
*B65D 77/20* (2006.01)
*B65D 51/24* (2006.01)
(Continued)

(52) U.S. Cl.
CPC ............ *B65D 77/2096* (2013.01); *B32B 3/02* (2013.01); *B32B 7/12* (2013.01); *B32B 29/002* (2013.01);
(Continued)

(58) Field of Classification Search
CPC ........ B32B 7/12; B32B 29/002; B32B 17/065
(Continued)

(56) References Cited

U.S. PATENT DOCUMENTS

D849,536 S * 5/2019 Trombetta ..................... D9/454
2013/0056469 A1 * 3/2013 Davis ................. B65D 75/5833
220/266

FOREIGN PATENT DOCUMENTS

JP 2001-083020 A 3/2001
JP 2003-076278 A 3/2003

* cited by examiner

*Primary Examiner* — Anthony D Stashick
*Assistant Examiner* — Raven Collins
(74) *Attorney, Agent, or Firm* — Squire Patton Boggs (US) LLP

(57) ABSTRACT

Provided is an instant noodles container lid that provides indication according to elapse of time from the start of boiling water process. An instant noodles container lid includes a surface member, an intermediate member, and a seal base member having a sealant layer in order, respectively, from one surface side. The surface member has a printed layer in an area other than a first area. The intermediate member includes a paper layer, a printed layer, a filling layer, and a wax layer in order, respectively, from the one surface side, and the wax layer is in a second area that covers the first area. A first half cut is formed from the surface member into the paper layer, in the first area. A second half cut is formed in the second area from the filling layer into the paper layer in a portion outside of the first area.

2 Claims, 3 Drawing Sheets

(51) Int. Cl.
*B32B 3/02* (2006.01)
*B32B 7/12* (2006.01)
*B32B 29/00* (2006.01)
*B32B 29/04* (2006.01)
*B65D 77/30* (2006.01)
*B65D 81/34* (2006.01)

(52) U.S. Cl.
CPC ............ *B32B 29/04* (2013.01); *B65D 51/248* (2013.01); *B65D 77/30* (2013.01); *B65D 81/34* (2013.01); *B32B 2250/05* (2013.01); *B32B 2307/75* (2013.01); *B32B 2323/046* (2013.01); *B32B 2367/00* (2013.01); *B32B 2391/00* (2013.01); *B32B 2398/20* (2013.01); *B32B 2439/40* (2013.01); *B32B 2439/70* (2013.01); *B32B 2519/00* (2013.01); *B65D 2581/3404* (2013.01); *B65D 2581/3436* (2013.01)

(58) Field of Classification Search
USPC ........................................................ 220/269
See application file for complete search history.

INSTANT NOODLES CONTAINER LID

TECHNICAL FIELD

The present invention relates to a lid used for a packaging container that contains instant noodles.

BACKGROUND ART

Foods such as instant noodles in a cup need to be subjected to boiling water process (heating and cooking) such as reconstituting noodles in boiling water by pouring of boiling water followed by waiting for elapse of a predetermined time, when the foods are eaten. Such a boiling water process is performed such that a lid that covers an opening is partially removed from a cup-shaped container body, boiling water is poured through the opening having been opened, the opening is closed with the lid again, and waiting is performed. An approximate time for the waiting is determined for each product. Conventionally, a user checks elapse of the approximate time by using a clock and, thereafter, completely removes the lid from the container body and starts eating in general.

Meanwhile, an indicator label the state of which changes due to heat with elapse of time is known (Patent Literature 1, 2). In such an indicator, wax which is melted due to heat and a sheet member that has its color changed by permeation of the melted wax are layered and adhered to a product by using an adhesive.

CITATION LIST

Patent Literature

[PTL 1] Japanese Patent No. 4833458
[PTL 2] Japanese Patent No. 3426546

SUMMARY OF THE INVENTION

Problems to be Solved by the Invention

If a user is allowed to know elapse of the approximate time without using a clock, the convenience can be improved. Therefore, it can be considered that the above-described indicator label is attached to a packaging container.

However, the above-described indicator label is structured so as to be attached by using an adhesive tape. Therefore, if the indicator label is attached to the packaging container, the indicator label may be detached during transportation. Furthermore, in recent years, for instant foods, seasoning liquid, seasoning, or the like which is poured later is fixed to a lid by a melt adhesive or an adhesive, and a user may erroneously recognize the indicator as the seasoning or the like and remove it. Therefore, it is difficult to attach a conventional indicator label to a lid.

The present invention has been made in view of such circumstances, and an object of the present invention is to provide an instant noodles container lid that provides indication according to elapse of time from the start of boiling water process.

Solution to the Problems

One aspect of the present invention for solving the aforementioned problem is an instant noodles container lid that includes a surface member, an intermediate member, and a seal base member having a sealant layer in order, respectively, from one surface side to the other surface side. The surface member has a printed layer in an area other than a predetermined first area. The intermediate member includes a paper layer, a printed layer, a filling layer, and a wax layer in order, respectively, from the one surface side, and the wax layer is in a second area that covers the first area in a planar view of the lid. A first half cut is formed from the surface member into the paper layer of the intermediate member, in the first area. A second half cut is formed in the second area from the filling layer of the intermediate member into the paper layer thereof in a portion opposing an outer side of the first area.

Advantageous Effects of the Invention

According to the present invention, the lid itself of the instant noodles container can provide indication of elapse of time from the start of the boiling water process, thereby enhancing convenience.

DESCRIPTION OF EMBODIMENTS

Embodiment

Figure 1:
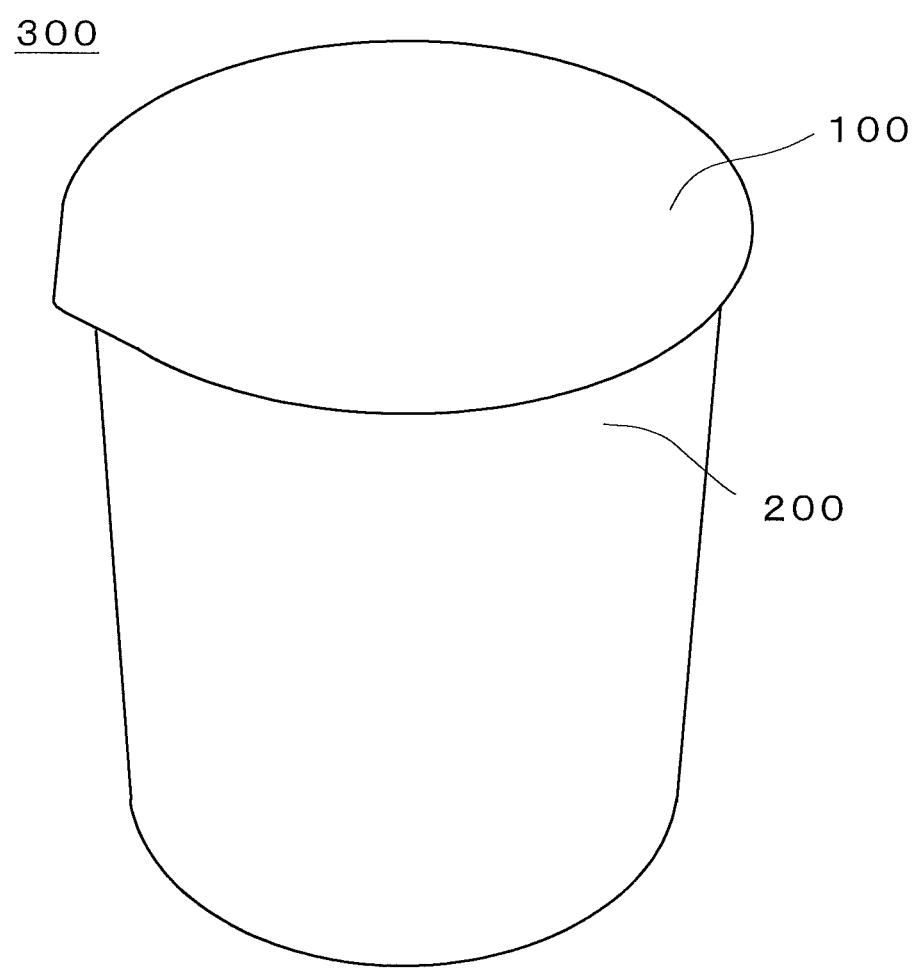
FIG. 1 is a perspective view of a packaging container according to one embodiment of the present invention.
Figure 2:
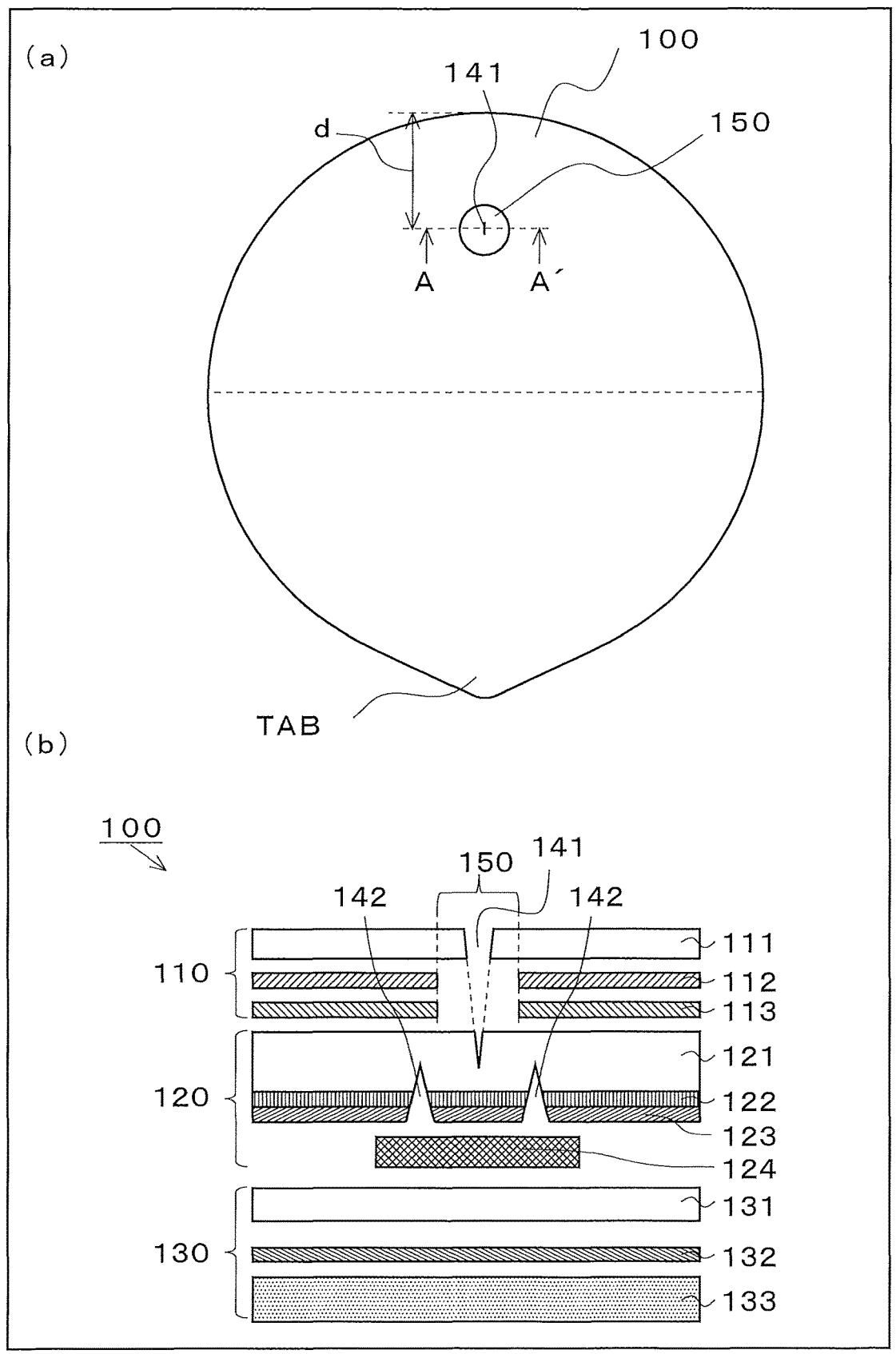
FIG. 2 is a plan view and schematic cross-sectional view of a lid according to one embodiment of the present invention.

Hereinafter, one embodiment of the present invention will be described. FIG. 1 is a perspective view of a packaging container 300, for instant noodles, which includes a lid 100 according to the present embodiment, and a container body 200 to which the lid 100 is sealed. (a) of FIG. 2 is a plan view of the lid 100. (b) of FIG. 2 schematically illustrates a partial cross-section taken along the line A-A' in (a) of FIG. 2. The lid 100 includes a surface member 110, an intermediate member 120, and a seal base member 130 in order, respectively. The lid 100 has a window hole 150 that is a predetermined region having, for example, a round shape. As described below, the window hole shows an indicator.

The surface member 110 has a PET (polyethylene terephthalate) layer 111, a pattern printed layer 112, and a light-shielding printed layer 113 in order, respectively, starting from the outer side of the packaging container 300. The pattern printed layer 112 and the light-shielding printed layer 113 are not formed in the window hole 150.

The intermediate member 120 has a paper layer 121, a printed layer 122, a filling layer 123, and a wax layer 124 in order, respectively, starting from the side close to the surface member 110. The wax layer 124 is formed in an area wider than that of the window hole 150 so as to cover window hole 150 in a planar view of the lid 100. The filling layer can be formed by coating with a thermoplastic resin or a known coating material such as a low density polyethylene, a medium density polyethylene, a high density polyethylene, a straight chain (linear) low density polyethylene, ethylene.α-olefin copolymer obtained by polymerization using a metallocene catalyst (single-site catalyst), polypropylene, ethylene.vinyl acetate copolymer, ionomer resin, ethylene.ethyl acrylate copolymer, ethylene.acrylic acid copolymer, ethylene.methacrylic acid copolymer, ethylene.propylene copolymer, methylpentene polymer, acid-modified polyolefin resin obtained by polyolefin resin such as polyethylene or polypropylene being modified with unsaturated carboxylic acid such as acrylic acid, methacrylic acid, maleic anhydride or fumaric acid, polyethylene terephthalate resin, polybutylene terephthalate resin, or nylon resin, by using a known coating technique.

The seal base member 130 includes a thermoplastic resin layer 131, an aluminium layer 132, and a sealant layer 133 in order, respectively, from the side close to the intermediate member 120. For the thermoplastic resin layer, a low density polyethylene, a medium density polyethylene, a high density polyethylene, a straight chain (linear) low density polyethylene, ethylene α-olefin copolymer obtained by polymerization using a metallocene catalyst (single-site catalyst), polypropylene, ethylene.vinyl acetate copolymer, ionomer resin, ethylene.ethyl acrylate copolymer, ethylene.acrylic acid copolymer, ethylene.methacrylic acid copolymer, ethylene.propylene copolymer, methylpentene polymer, acid-modified polyolefin resin obtained by polyolefin resin such as polyethylene or polypropylene being modified with unsaturated carboxylic acid such as acrylic acid, methacrylic acid, maleic anhydride or fumaric acid, polyethylene terephthalate resin, polybutylene terephthalate resin, or nylon resin, may be used.

The window hole 150 has a first half cut 141 formed from the surface member 110 into the paper layer 121 of the intermediate member 120. Furthermore, a second half cut 142 is formed from the filling layer 123 of the intermediate member 120 into the paper layer 121 thereof in a portion, near the outer side of the window hole 150, in which the wax layer is formed.

Figure 3:
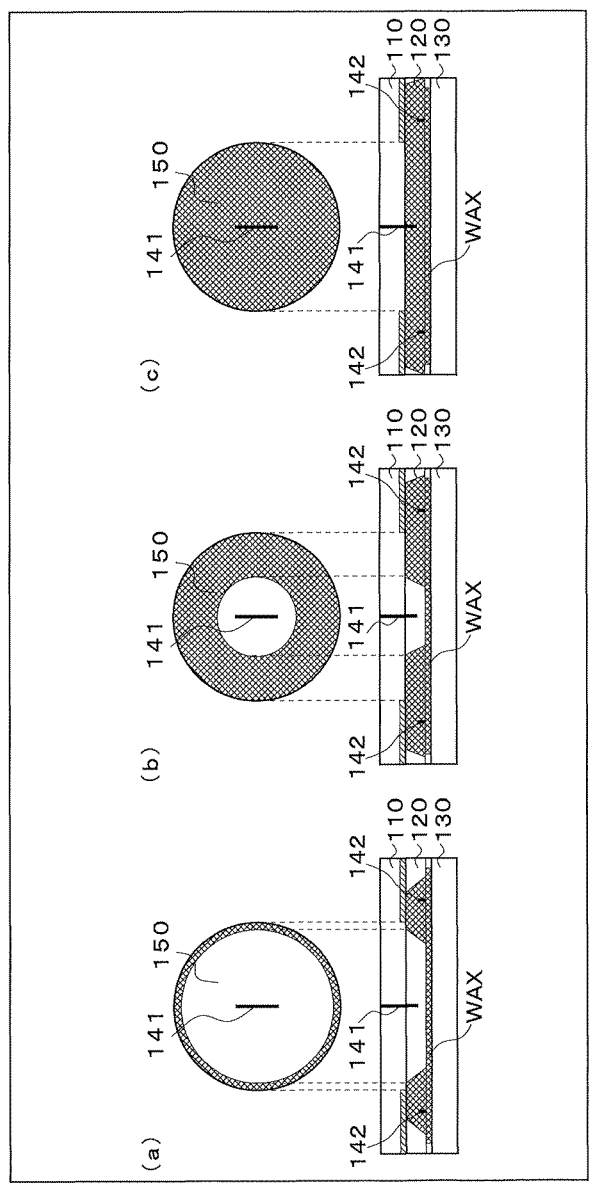
FIG. 3 is an enlarged plan view and schematic cross-sectional view of a window hole of the lid according to one embodiment of the present invention.

State change of the lid 100 in the case of boiling water being poured into the container body 200 will be described below. FIG. 3 is a plan view and cross-sectional view of the lid 100 (see FIG. 2) near the window hole 150. Due to air in the packaging container 300 (see FIG. 1) which has its higher temperature by boiling water, the lid 100 that closes the opening of the container body 200 (see FIG. 1) is also heated, and, as shown in (a) of FIG. 3. viscosity of the wax of the wax layer 124 (see FIG. 2) starts to be lowered, and the wax having the lowered viscosity starts to permeate into the paper layer 121 (see FIG. 2) through the second half cut 142. When the wax permeates, transparency of the paper layer 121 is higher. Therefore, when the wax permeates into the paper layer 121 inside the window hole 150, the printed color of the printed layer 122 (see FIG. 2) permeates into the paper layer 121, whereby change of the color can be visually confirmed from the surface member 110 side. The first half cut 141 can allow air contained in the paper layer 121 to be removed to the outside of the lid 100, and facilitates more smooth permeation of the wax. Furthermore, printing of the light-shielding printed layer 113 (see FIG. 2) shields an area other than the window hole 150 from light that comes from the paper layer 121 side. Therefore, the change of the color is hidden and is not visually confirmed, and the printed color of the pattern printed layer 112 (see FIG. 2) is maintained, and the design is not impaired.

When the permeation of the wax into the paper layer 121 advances, an area into which the printed color of the printed layer 122 permeates is widened as shown in (b) of FIG. 3, and a color-changed area which is visually confirmed through the window hole 150 is widened. When the permeation has spread over the entirety of the paper layer 121 inside the window hole 150, the entire portion inside the window hole 150 have its color changed, as shown in (c) of FIG. 3.

As described above, elapse of time after pouring boiling water can be recognized by increase of the color-changed area which is visually confirmed through the window hole 150. The melting point of the wax of the wax layer 124, the material and the thickness of the paper layer 121, the size of the window hole 150, and the positions, lengths, depths, shapes, and the like of the first half cut 141 and the second half cut 142 are appropriately designed, whereby a speed at which the color-changed area increases can be adjusted according to time required for heating process for the content. Furthermore, the thickness of the paper layer 121 is appropriately designed, whereby influence of the temperature, airflow, or the like outside the packaging container 300, on the temperature of the wax layer 124 can be reduced to a necessary degree. Thus, a user is allowed to know a time when the content is to be eaten.

The layer structure and the like of the lid 100 described above are exemplary ones, and may not be limited to any specific ones when the permeation of the wax of the wax layer 124 into the paper layer 121 can be visually confirmed from the outside of the packaging container 300. For example, the window hole 150, the pattern printed layer 112, or the light-shielding printed layer 113 may have another shape according to the design of the lid 100 or the like. The window hole 150 may not be round. The pattern printed layer 112 and the light-shielding printed layer 113 may be structured as one layer when the paper layer 121 can be hidden. Furthermore, the printed layer 122 of the intermediate member 120 can be colored with any color when the color is transmitted through the paper layer 121 and can be confirmed when the wax permeates into the paper layer 121. In addition thereto or instead thereof, the wax of the wax layer 124 may be colored with any color.

When the seal base member 130 contains a base material such as the thermoplastic resin layer 131, heat is less likely to be conducted to the wax layer 124 and the wax can be prevented from being melted in the case of an intermediate material and the seal base member 130 being laminated. Furthermore, stripping varnish may be further layered over the surface of the PET layer 111 of the surface member in order to prevent the wax layer 124 from adhering to the opposing surface member 110 and being separated when an intermediate material foil led by lamination of the surface member 110 and the intermediate member 120 is wound or a plurality of the intermediate materials are stacked, to store or transport the intermediate materials. Viscosity at room temperature may be adjusted by mixing a low melting point material in the wax in order to prevent the wax layer 124 from being broken.

According to the present invention, a conventional indicator label need not be attached because the lid itself has an indicator the state of which changes due to heat, and detachment or erroneous recognition by a user does not occur. Furthermore, as compared to a case where a conventional indicator label is attached to an outside portion, since the wax layer is disposed inside the packaging container, heat is conducted faster to the wax in the case of boiling water being poured, and change of color immediately starts, thereby enhancing responsiveness. Furthermore, for example, in a plurality of process steps such as forming of the wax layer, lamination of the seal base member, and label punching, testing can be performed. Therefore, simultaneously when the lid is produced, the quality of the indicator function can be assuredly ensured.

EXAMPLES

As an example of the present invention, the lid 100 shown in FIG. 2 was produced. The surface member 110 had a 12 μm of a PET layer, a pattern-printed layer, and a light-shielding printed layer in order, respectively, starting from the outer side of the packaging container. The intermediate member 120 had a one-side art paper layer (104.7 g/m²)/red ink layer/filling layer/wax layer. The seal base member 130 had a 12 μm of PET layer/9 μm of aluminium/45 μm of sealant layer. The wax layer was formed in a square range in which the size of one side was 15 mm, and the thickness of the wax layer at the position of the second half cut 142 was 0.1 mm.

The lid 100 had a diameter of 96 mm, and had a tab to be pinched for opening, at one portion of the circumferential edge. The window hole 150 had a round shape having the diameter of 8 mm, and was formed around a position as the center, on the diameter passing through the tab of the lid 100, at which a distance (d in FIG. 2) from the end edge on the side exactly opposite to the tab was 20 mm. Thus, in a case where the window hole 150 is disposed in an area (the upper half area in FIG. 2) on the side opposite to the tab, with respect to the diameter perpendicular to the diameter passing through the tab of the lid 100, also when the end edge near the tab is removed from the container body 200 for pouring boiling water, a portion near the window hole 150 is less likely to be removed. Therefore, advantageously, air is less likely to flow from the outside into a portion, inside the lid 100, of the packaging container 300, and the temperature is less likely to be lowered.

One first half cut 141 having the length of 2 mm was formed. The second half cut 142 having a round shape in which the diameter was 9 mm and the depth was 50 μm was positioned so as to be concentric with the window hole 150.

Five samples of the lid 100 according to example were produced, and were each sealed to the end edge of the opening of the container body 200 which had a volume of 500 ml and was formed from foamed polyethylene, thereby producing the packaging containers 300. 5 Hz to 50 Hz vibration was applied vertically to these samples for 60 minutes in compliance with the transportation testing method in JIS Z0232. Thereafter, the tab was pinched to open the lid over the length of 48 mm in the direction of the diameter passing through the tab, 300 ml of boiling water at 95° C. was poured, the opening was closed again, and a portion near the tab was fixed to the container body 200 by a tape. In the environment in which the temperatures was 40° C., a time from pouring of boiling water to change of the color of the entirety of the area inside the window hole 150 was measured. The results are indicated in Table 1.

TABLE 1

| | Color change finished time (seconds) | Peculiar indication |
|---|---|---|
| Sample 1 | 155 | none |
| Sample 2 | 140 | none |
| Sample 3 | 147 | none |
| Sample 4 | 152 | none |
| Sample 5 | 160 | none |
| Average | 150.8 | none |

As indicated in Table 1, it can be confirmed that, in any of the lids of the respective samples, peculiar indication did not occur due to, for example, separation between the layers in the window hole portion, and the time required for change of the color was within a range of 140 to 160 seconds, and the elapse of the time after pouring boiling water was able to be stably indicated even after transportation.

INDUSTRIAL APPLICABILITY

The present invention is useful for a lid for an instant noodles container and the like.

DESCRIPTION OF THE REFERENCE CHARACTERS

100 lid
110 surface member
111 PET layer
112 pattern printed layer
113 light-shielding printed layer
121 paper layer
122 printed layer
123 filling layer
124 wax layer
131 thermoplastic resin layer
132 aluminium layer
133 sealant layer
141 first half cut
142 second half cut
150 window hole
200 container body
300 packaging container

The invention claimed is:

1. An instant noodles container lid that includes a surface member, an intermediate member, and a seal base member having a sealant layer in order, respectively, from one surface side to the other surface side, wherein
   the surface member has a printed layer in an area other than a predetermined first area,
   the intermediate member includes a paper layer, a printed layer, a filling layer, and a wax layer in order, respectively, from the one surface side, and the wax layer is in a second area that covers the first area in a planar view of the lid,
   a first half cut is formed from the surface member into the paper layer of the intermediate member, in the first area,
   a second half cut is formed in the second area from the filling layer of the intermediate member into the paper layer thereof in a portion opposing an outer side of the first area, and
   the printed layer of the surface member includes at least a light-shielding printed layer that blocks light coming from the paper layer side.

2. The instant noodles container lid according to claim 1, wherein a polyethylene terephthalate film is layered over a surface, on the one surface side, of the surface member.

* * * * *